July 12, 1932.                H. P. MORRIS                 1,866,663
            AIR CLEANER AND AIR TURBINATION INDUCTOR
                    Filed Oct. 11, 1928        2 Sheets-Sheet 1
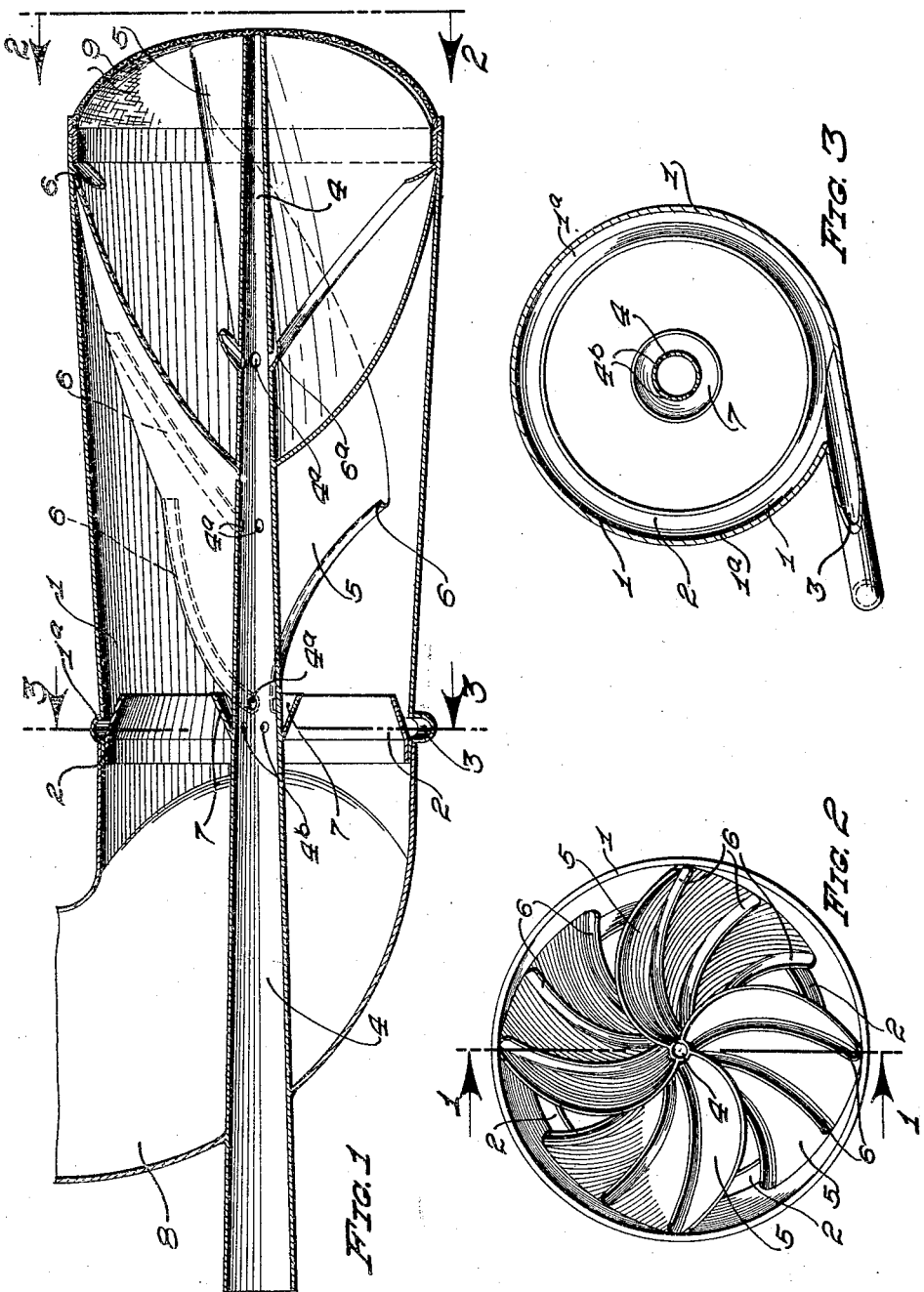
INVENTOR.
HARRY P. MORRIS
BY A.B.Bowman
ATTORNEY July 12, 1932. H. P. MORRIS 1,866,663
AIR CLEANER AND AIR TURBINATION INDUCTOR
Filed Oct. 11, 1928 2 Sheets-Sheet 2
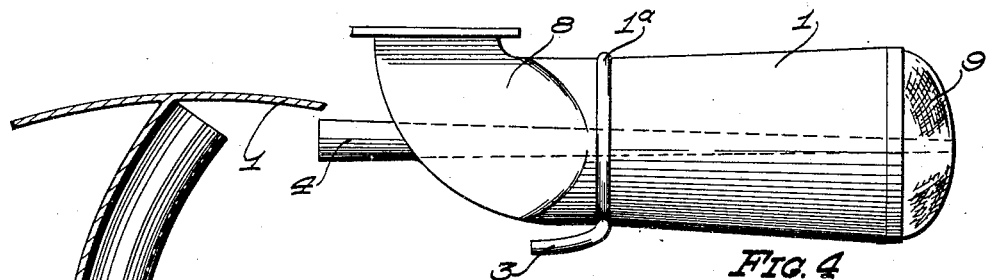
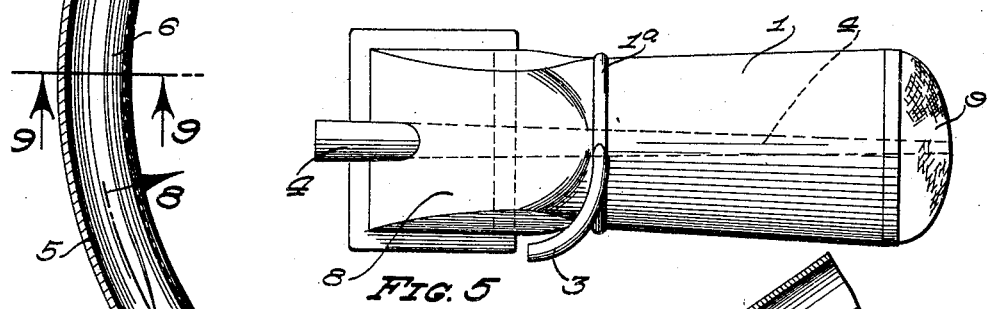
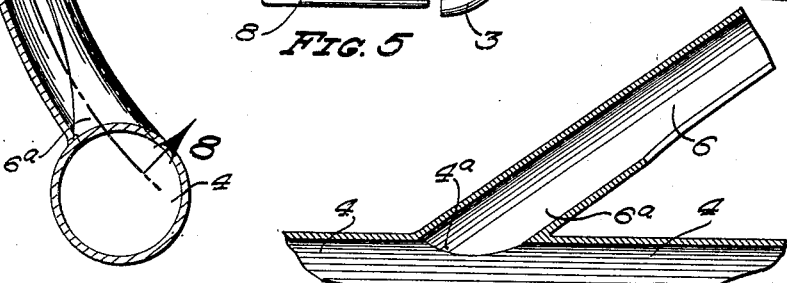
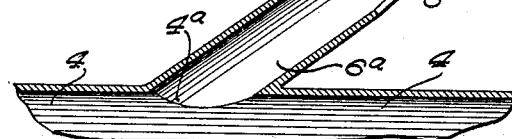
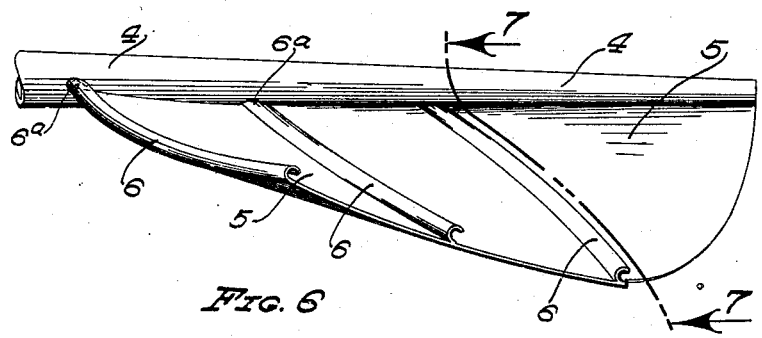
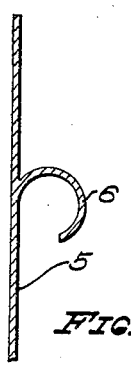
INVENTOR.
HARRY P. MORRIS
BY A. B. Bowman
ATTORNEY.

Patented July 12, 1932

1,866,663

UNITED STATES PATENT OFFICE

HARRY P. MORRIS, OF CORONADO, CALIFORNIA, ASSIGNOR TO KARL F. SMITH, OF CORONADO, CALIFORNIA

AIR CLEANER AND AIR TURBINATION INDUCTOR

Application filed October 11, 1928. Serial No. 311,723.

My invention relates to air cleaners and air turbination inductors and the objects of my invention are: first, to provide a device of this class which is adaptable to any type of internal combustion engine but more particularly adapted for those types of internal combustion engines which have carbureters for mixing the fuel with air; second, to provide a device of this class which removes moisture particles and dirt particles from the air before reaching the carbureter; third, to provide a device of this class which does not tend to choke the air intake to the carbureter or interfere with its proper function; fourth, to provide a device of this class in which there are no moving parts, the velocity of the air passing through the device and the inertia of the deleterious particles therein being sufficient to cause the rejection of said particles; fifth, to provide a device of this class in which a turbination effect is caused in the air as it passes through, greatly increasing the ability of the air to atomize the fuel and reduce to a minimum the globules of fuel in the mixture; sixth, to provide a device of this class in which dust and moisture removed from the air are exhausted, thereby eliminating a periodic renewal of the air cleaner or a periodic removal of collected deleterious matter; seventh, to provide a device of this class which, when used in connection with automobiles or land planes, will remove the large quantities of deleterious matter from the air which are present in extremely dusty roads or landing fields; eighth, to provide a device of this class which, when used in connection with motor boats and seaplanes, removes water which would normally splash into the carbureter or would be drawn into the carbureter and cause the engine to missfire; ninth, to provide a device of this class which keeps the carbureter free from deleterious matter under all conditions of weather; tenth, to provide a device of this class which materially reduces the wear and tear on the moving parts of the engine to which it is connected by reason of the fact that the gritty particles which cause a large percentage of this wear are removed; eleventh, to provide a device of this class which increases the power of an internal combustion engine to which this device is applied due to the fact that the air is directed into the carbureter in a turbinated condition causing complete atomization and even distribution of the fuel and complete subsequent explosion, and twelfth, to provide a device of this class which is extremely simple of construction proportional to its functions, durable, efficient in its action and which will not readily deteriorate or get out or order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a longitudinal sectional view of my air cleaner and air turbination inductor taken through 1—1 of Fig. 2; Fig. 2 is an end elevational view thereof; Fig. 3 is a sectional view thereof through 3—3 of Fig. 1; Fig. 4 is a reduced side elevational view thereof; Fig. 5 is a bottom view thereof on the same scale as Fig. 4; Fig. 6 is a fragmentary elevational view of the deleterious matter removing tube or Pitot tube with one of the scavenging and turbinating vanes shown in relation thereto; Fig. 7 is an enlarged sectional view through 7—7 of Fig. 6 on a plane substantially parallel with the scavenging channel; Fig. 8 is an enlarged fragmentary sectional view through 8—8 of Fig. 7, and Fig. 9 is a fragmentary sectional view through 9—9 of Fig. 7.

Similar characters of reference refer to similar parts and portions throughout the several views of the drawings.

Shell member 1, deflecting member 2, discharge tube 3, Pitot tube 4, turbinating vanes 5, scavenging channels 6, scoop member 7, air outlet 8, and screen member 9, constitute the principal parts and portions of my air cleaner and air turbination inductor.

The shell member 1 is preferably circular in cross-section and decreases in diameter from the forward to the rear end thereof. Near the rear end portion of the shell member is provided an internal, annular channel portion 1a, as shown best in Figs. 1 and 3 of the drawings. Joining the rear side of the channel 1a and extending forwardly thereover is a deflecting member 2 which decreases in diameter towards its forward end so as to form a space between it and the inner surface of the shell member. Any particles of water, dirt or other deleterious matter which may be passing in this space is deflected into the channel portion 1a. Connected with the channel portion and preferably extending tangential therewith is one or more discharge tubes 3 which extend outwardly, then turn backwardly in a relatively long curve until the extended ends face backwardly, as shown in Figs. 3, 4 and 5.

Centered relative to the shell member 1 and preferably extending beyond both ends thereof, is a Pitot tube 4. This tube increases in diameter from the forward towards the rear end thereof, as shown best in Fig. 1 of the drawings. The Pitot tube 4 is supported relative to the shell member 1 by means of a plurality of turbinating vanes 5. The cross-section through each one of these vanes is a spiral, preferably an Archimedes spiral. In addition to the spiral cross-section each vane follows a helical path along the outer periphery of the Pitot tube, as shown best in Figs. 1 and 6 of the drawings. The outer periphery of each vane follows a corresponding helical path along the inner wall of the shell member 1, as shown best in Figs. 1 and 2 of the drawings. The vanes are preferably joined for their full length to the tube 4 but only for an intermediate portion of their lengths to the shell 1.

The forward ends of each vane 5 connect between the forward ends of the Pitot tube and the shell member. As the Pitot tube extends forwardly of the shell member a short distance the vanes also extend forwardly of the shell member, as shown in Figs. 1, 4 and 5 of the drawings, so as to receive air from all angles.

The rear portion of each vane extends from a point intermediate the ends of the shell 1 to a point on the Pitot tube almost even with the rear end of the shell 1, as shown in Fig. 1 of the drawings. Thus the rear edge of each vane is at a considerable angle with the air which passes through the shell member.

The rear end of each turbinating vane 5 is provided with a scavenging channel 6 which also extends at a considerable angle with the direction of flow of air. Each scavenging channel 6 merges into a tube 6a as it intersects the Pitot tube 4 forming a passage through a hole 4a in said Pitot tube. Other channels 6 are provided intermediate the ends of each turbinating vane, each channel 6 being at a considerable angle with the flow of air and intersecting the Pitot tube, as shown best in Figs. 1, 7 and 8 of the drawings.

The tube 4 with these scavenging channels 6 forms a Pitot tube having a plurality of pressure receiving openings as each channel delivers additional pressure to the Pitot tube. For this reason the increase in diameter of the Pitot tube from the forward to the rear ends thereof is substantially proportional to the increase in total area of holes 4a intersecting therewith.

In addition to the scavenging channels 6, a scoop member 7 surrounds the Pitot tube. The scoop member 7 is substantially funnel shaped with the open side thereof facing the forward end of the tube and the smaller side thereof intersecting the tube, as shown in Fig. 1 of the drawings. Holes 4b near the base of the scoop cause air passing into the scoop to be directed into the Pitot tube.

Connected to the rear end of the shell member 1 and preferably curving away therefrom is an air outlet 8. The Pitot extends through this outlet so as to discharge particles delivered to it, as shown in Fig. 1. The air outlet may be of any shape which will not interfere with the action of the vanes, scavenging tubes, deflecting members, and tube members. The air outlet is adapted to connect with the air intake of a carbureter. As the shape, size and construction of the various intakes to carbureters vary considerably, the shape, size and construction of the air outlet must vary correspondingly.

Over the forward end of the shell member, vanes and Pitot tube is positioned a screen member 9 which is adapted to prevent the larger particles of deleterious matter from entering and to break up liquid matter so that it may be more easily removed from the air. In cases where sleet or ice particles are apt to freeze over the air intake, the screen member 9 may be omitted.

The operation of my apparatus is as follows: Air having normal or abnormal amounts of dirt particles and water particles enter through the forward end of the shell member 1. The impure air strikes the various vanes 5 and becomes turbinated thereby. The particles of dirt and water engage the various scavenging channels 6 and are directed along said channels into the Pitot tube 4 from which they are discharged. Other particles of dirt and water are thrown by the whirling action of the air against the inner periphery of the shell member 1. They travel therealong and are deflected into the channel 1a where they are removed by the discharge tube 3.

Air striking the end of the Pitot tube 4 and also the air passing through air passage formed by the shell member 1 where it engages the scavenging channels 6, causes a considerable draft to be created in the Pitot tube 4, said draft being capable of sucking or drawing the dust or water particles from the scavenging channels. The dirt and water particles having a great deal more inertia than the air, are correspondingly more affected by the Pitot tube and scavenging channels; hence the air and the particles therein become separated. The air freed of deleterious matter passes between the deflecting member 2 and the scoop member 7 into the air outlet. Under ordinary conditions there is considerable velocity of air through the shell member, the air after passing therethrough is in rapid rotation or turbination, a condition which is greatly desirable for complete atomization of fuel. The number of vanes and their position, the number of scavenging channels and their position, the size and length of the shell member, the construction of the Pitot tube, are all dependent upon the speed, size and horse power of the engine to which the device is connected and also dependent upon the construction, operation and the other special features of the carbureter attached to the air outlet.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a device of the class described, an air passage, a plurality of vanes positioned helically within said air passage, a plurality of ducts formed on each vane for directing particles towards the central portions of said vane, and a discharge tube communicating with the inner terminals of said ducts.

2. In a device of the class described, an air passage, a plurality of stationary vanes positioned helically within said air passage, a plurality of scavenging channels formed in each of said vanes for receiving particles and directing said particles towards the central portions of said vanes, and a discharge tube communicating with the inner terminals of said channels.

3. In a device of the class described, an air passage, a tube positioned therein and extending out one side thereof, a plurality of vanes secured in helical relation to said tube and said air passage, and a plurality of ducts formed on each vane for directing particles into said tube, said vanes being curved in cross section to facilitate the conduction of particles in said ducts towards said tube.

4. In a device of the class described, an air passage, having a screen over the entrance end thereof, a tube positioned longitudinally therein and extending out one side thereof, a plurality of helical vanes arranged between said tube and the walls of said air passage, and duct means formed in said helical vanes and communicating with said tube for conducting particles into said tube, the movement of said particles along said duct means assisted by the movement of air through said tube.

5. In a device of the class described, an air passage having a screen over the entrance end thereof, a tube positioned longitudinally therein and extending out one side thereof, a plurality of helical vanes arranged between said tube and the walls of said air passage, and duct means formed in said helical vanes and communicating with said tube for conducting particles into said tube, said helical vanes being curved in cross section to facilitate the movement of particles along said duct means and into said tube, the movement of said particles along said duct means also assisted by the movement of air through said tube.

6. In a device of the class described, an air passage, a tube positioned therein, a plurality of vanes secured in helical relation to said tube and said air passage, a plurality of ducts formed on each vane and communicating with said tube for directing particles into said tube, an annular channel portion formed in said air passage, a deflector means positioned adjacent to said channel for deflecting particles thrown outwardly by said vanes into said channel portion, and a discharge means communicating with said channel portion.

7. In a device of the class described, an air passage, a tube positioned therein, a plurality of vanes secured in helical relation to said tube and said air passage, said vanes being curved in cross section to facilitate the conduction of particles towards said tube, an annular channel portion formed in said air passage, a deflector means positioned adjacent to said channel for deflecting particles thrown outwardly by said vanes into said channel portion, and a discharge means communicating with said channel portion.

8. In a device of the class described, an air passage, a tube positioned longitudinally therein and extending out one side thereof, a plurality of helical vanes arranged between said tube and the walls of said air passage, duct means formed in said helical vanes for conducting particles to said tube, said helical vanes being curved in cross section to facilitate the movement of particles along said duct means and into said tube, the movement of said particles along said duct means also assisted by the movement of air through said tube, an annular channel portion formed in said air passage, a deflector means positioned adjacent to said channel for deflecting particles thrown outwardly by said vanes into said channel portion, and a discharge means communicating with said channel portion.

9. In a device of the class described, an air passage, a tube positioned therein, a plurality of vanes secured in helical relation to said tube and said air passage, a plurality of ducts formed on each vane and communicating with said tube for directing particles into said tube, an annular channel portion formed in said air passage, a deflector means positioned adjacent to said channel for deflecting particles thrown outwardly by said vanes into said channel portion, a discharge means communicating with said channel portion, a scoop means positioned on and forming a pocket with said tube at the rear of said vanes and substantially transversely in line with said deflector, and said tube having holes in communication with said pocket.

10. In a device of the class described, an air passage, a tube positioned therein, a plurality of vanes secured in helical relation to said tube and said air passage, said vanes being curved in cross section to facilitate the conduction of particles towards said tube, an annular channel portion formed in said air passage, a deflector means positioned adjacent to said channel for deflecting particles thrown outwardly by said vanes into said channel portion, a discharge means communicating with said channel portion, a scoop means positioned on and forming a pocket with said tube at the rear of said vanes and substantially transversely in line with said deflector, and said tube having holes in communication with said pocket.

11. In a device of the class described, an air passage, a tube positioned longitudinally therein and extending out one side thereof, a plurality of helical vanes arranged between said tube and the walls of said air passage, duct means formed in said helical vanes and communicating with said tube for conducting particles into said tube, an annular channel portion formed in said air passage, a deflector means positioned adjacent to said channel for deflecting particles thrown outwardly by said vanes into said channel portion, a discharge means communicating with said channel, a scoop means positioned on and forming a pocket with said tube at the rear of said vanes, and said tube having holes in communication with said pocket.

12. In a device of the class described, an air passage, a tube positioned longitudinally therein and extending out one side thereof, a plurality of helical vanes arranged between said tube and the walls of said air passage, duct means formed in said helical vanes for conducting particles to said tube, said helical vanes being curved in cross section to facilitate the movement of particles along said duct means and into said tube, the movement of said particles along said duct means also assisted by the movement of air through said tube, an annular channel portion formed in said air passage, a deflector means positioned adjacent to said channel for deflecting particles thrown outwardly by said vanes into said channel portion, a discharge means communicating with said channel portion, a scoop means positioned on and forming a pocket with said tube at the rear of said vanes and substantially transversely in line with said deflector, and said tube having holes in communication with said pocket.

13. In a device of the class described, an air passage, a tube positioned therein, a plurality of vanes secured in helical relation to said tube and said air passage, a plurality of ducts formed on each vane and communicating with said tube for directing particles into said tube, an annular channel portion formed in said air passage, a deflector means positioned adjacent to said channel for deflecting particles thrown outwardly by said vanes into said channel portion, a discharge means communicating with said channel portion, a scoop means positioned on and forming a pocket with said tube at the rear of said vanes and substantially transversely in line with said deflector, said tube having one or more holes in communication with said pocket, and means comprising a screen located over the entrance of said air passage for breaking up liquid matter and preventing large particles of deleterious matter from entering said air passage.

14. In a device of the class described, an air passage, a tube positioned therein, a plurality of vanes secured in helical relation to said tube and said air passage, said vanes being curved in cross section to facilitate the conduction of particles towards said tube, an annular channel portion formed in said air passage, a deflector means positioned adjacent to said channel for deflecting particles thrown outwardly by said vanes into said channel portion, a discharge means communicating with said channel portion, a scoop means positioned on and forming a pocket with said tube at the rear of said vanes and substantially transversely in line with said deflector, said tube having one or more holes in communication with said pocket, and a means comprising a screen located over the entrance end of said air passage for breaking up liquid matter and preventing large particles of deleterious matter from entering said air passage.

15. In a device of the class described, an air passage, a tube positioned longitudinally therein and extending out one side thereof, a plurality of helical vanes arranged between said tube and the walls of said air passage, duct means formed in said helical vanes and communicating with said tube for conducting particles into said tube, an annular channel portion formed in said air passage, a deflector means positioned adjacent to said channel for deflecting particles thrown outwardly by said vanes into said channel portion, a scoop means positioned on and forming a pocket with said tube at the rear of said vanes and substantially transversely in line with said deflector said tube having one or more holes in communication with said pocket, and a means comprising a screen located over the entrance end of said air passage for breaking up liquid matter and preventing large particles of deleterious matter from entering said air passage.

16. In a device of the class described, an air passage, a tube positioned longitudinally therein and extending out one side thereof, a plurality of helical vanes arranged between said tube and the walls of said air passage, duct means formed in said helical vanes for conducting particles to said tube, said helical vanes being curved in cross section to facilitate the movement of particles along said duct means and into said tube, the movement of said particles along said duct means also assisted by the movement of air through said tube, an annular channel portion formed in said air passage, a deflector means positioned adjacent to said channel for deflecting particles thrown outwardly by said vanes into said channel portion, a scoop means positioned on and forming a pocket with said tube at the rear of said vanes and substantially transversely in line with said deflector said tube having one or more holes in communication with said pocket, and a means comprising a screen located over the entrance end of said air passage for breaking up liquid matter and preventing large particles of deleterious matter from entering said air passage.

17. In an air cleaning device, an air passage, a plurality of vanes positioned helically within said air passage, and a plurality of ducts formed on each vane and in communication with the exterior of said passage for directing particles of deleterious matter out of said air passage.

18. In an air cleaning device, an air passage, a plurality of vanes positioned helically within said air passage, a plurality of ducts formed on each vane, and discharge means communicating with said ducts.

19. In an air cleaning device, the combination of an air passage, a plurality of stationary vanes positioned helically within said air passage, and a plurality of dust channels formed in each of said vanes for receiving particles of deleterious matter and in communication with the exterior of said passage for directing said particles out of said passage.

20. In an air cleaning device, the combination of an air passage, a plurality of stationary vanes positioned helically within said air passage, a plurality of dust channels formed in each of said vanes for receiving particles of deleterious matter, and a discharge means to which said channels communicate, whereby said particles are conveyed to the exterior of said air passage.

21. In an air cleaning device, the combination of an air passage, a plurality of vanes secured in helical relation to said passage, a plurality of ducts formed on each vane for receiving particles of deleterious matter, a discharge means to which said ducts communicate whereby said particles received by said ducts are conveyed to the exterior of said passage, an annular channel portion formed in said passage, a deflector means positioned adjacent to said channel for deflecting particles thrown outwardly by said vanes into said channel portion, a discharge means communicating with said channel portion whereby said particles are conveyed out of said channel to the exterior of said passage.

22. In an air cleaning device, the combination of an air passage having a screen over the entrance end thereof, a plurality of vanes secured in helical relation to said passage, a plurality of ducts formed on each vane for receiving particles of deleterious matter, a discharge means to which said ducts communicate whereby said particles received by said ducts are conveyed to the exterior of said passage, an annular channel portion formed in said passage, a deflector means positioned adjacent to said channel for deflecting particles thrown outwardly by said vanes into said channel portion, and a discharge means communicating with said channel portion whereby said particles are conveyed out of said channel to the exterior of said passage.

23. In an air cleaning device, the combination of an air passage, helical air swirling means located in said passage, and means associated with said helical air swirling means for removing particles of dirt, water or other deleterious matter from the air stream, and means communicating with said last named means for conveying said particles to the exterior of said air passage.

In testimony whereof, I have hereunto set my hand at San Diego, California, this 1st day of October, 1928.

HARRY P. MORRIS.